United States Patent
Costa-Roberts et al.

(10) Patent No.: US 12,531,783 B2
(45) Date of Patent: Jan. 20, 2026

(54) UNIFIED NETWORK ENTITY

(71) Applicant: Arista Networks, Inc., Santa Clara, CA (US)

(72) Inventors: Justin Costa-Roberts, San Francisco, CA (US); Charles Yixuan Ding, Foster City, CA (US); Ilwon Seo, San Francisco, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 18/545,674

(22) Filed: Dec. 19, 2023

(65) Prior Publication Data

US 2025/0150343 A1 May 8, 2025

Related U.S. Application Data

(60) Provisional application No. 63/547,788, filed on Nov. 8, 2023.

(51) Int. Cl.
*H04L 41/12* (2022.01)
*H04L 12/24* (2006.01)
*H04L 29/12* (2006.01)
*H04L 41/0853* (2022.01)

(52) U.S. Cl.
CPC ................................ *H04L 41/0853* (2013.01)

(58) Field of Classification Search
CPC .... H04L 41/0853; H04L 41/12; H04L 41/046
See application file for complete search history.

(56) References Cited

U.S. PATENT DOCUMENTS

| | | | | |
|---|---|---|---|---|
| 6,199,077 B1* | 3/2001 | Inala | ...................... | G06F 16/957 |
| 8,438,184 B1* | 5/2013 | Wang | ...................... | H04L 67/02 |
| | | | | 707/780 |
| 11,533,335 B2* | 12/2022 | Hale | ................... | H04L 63/1466 |
| 2005/0021683 A1* | 1/2005 | Newton | ................... | H04L 43/00 |
| | | | | 709/220 |
| 2014/0195666 A1* | 7/2014 | Dumitriu | ................. | H04L 43/55 |
| | | | | 709/223 |
| 2017/0235816 A1* | 8/2017 | Livshits | ................ | G06F 16/285 |
| | | | | 707/722 |
| 2019/0138638 A1 | 5/2019 | Pal et al. | | |
| 2020/0106675 A1* | 4/2020 | Sirton | ................. | H04L 41/0893 |
| 2022/0029877 A1* | 1/2022 | Duda | ...................... | H04L 45/22 |
| 2022/0345370 A1 | 10/2022 | Ding et al. | | |
| 2023/0334053 A1* | 10/2023 | Gupta | .................... | G06F 16/256 |

FOREIGN PATENT DOCUMENTS

EP     1039690 A2     9/2000

* cited by examiner

*Primary Examiner* — Umar Cheema
*Assistant Examiner* — Golam Mahmud
(74) *Attorney, Agent, or Firm* — Treyz Law Group, P.C.; Tianyi He

(57) ABSTRACT

A network entity aggregation system may obtain different information for entities of a network from various sources of network entity information. The network entity aggregation system may generate a list of unified network entities including a corresponding record for each unified network entity. Unified network entity information and/or aggregated network information of the unified network entities may be presented to a user via a web interface and/or provided to applications and/or services.

20 Claims, 11 Drawing Sheets

UNIFIED NETWORK ENTITY

This application claims the benefit of U.S. provisional patent application No. 63/547,788, filed Nov. 8, 2023, which is hereby incorporated by reference herein in its entirety.

BACKGROUND

A communication system includes multiple network devices that are interconnected to form a network for conveying network traffic between end hosts. Various types of network entities exist within the network such as host devices and network devices. The same network entity can be identified in different manners (e.g., depending on the network protocols employed) within the network.

DETAILED DESCRIPTION

Figure 1:
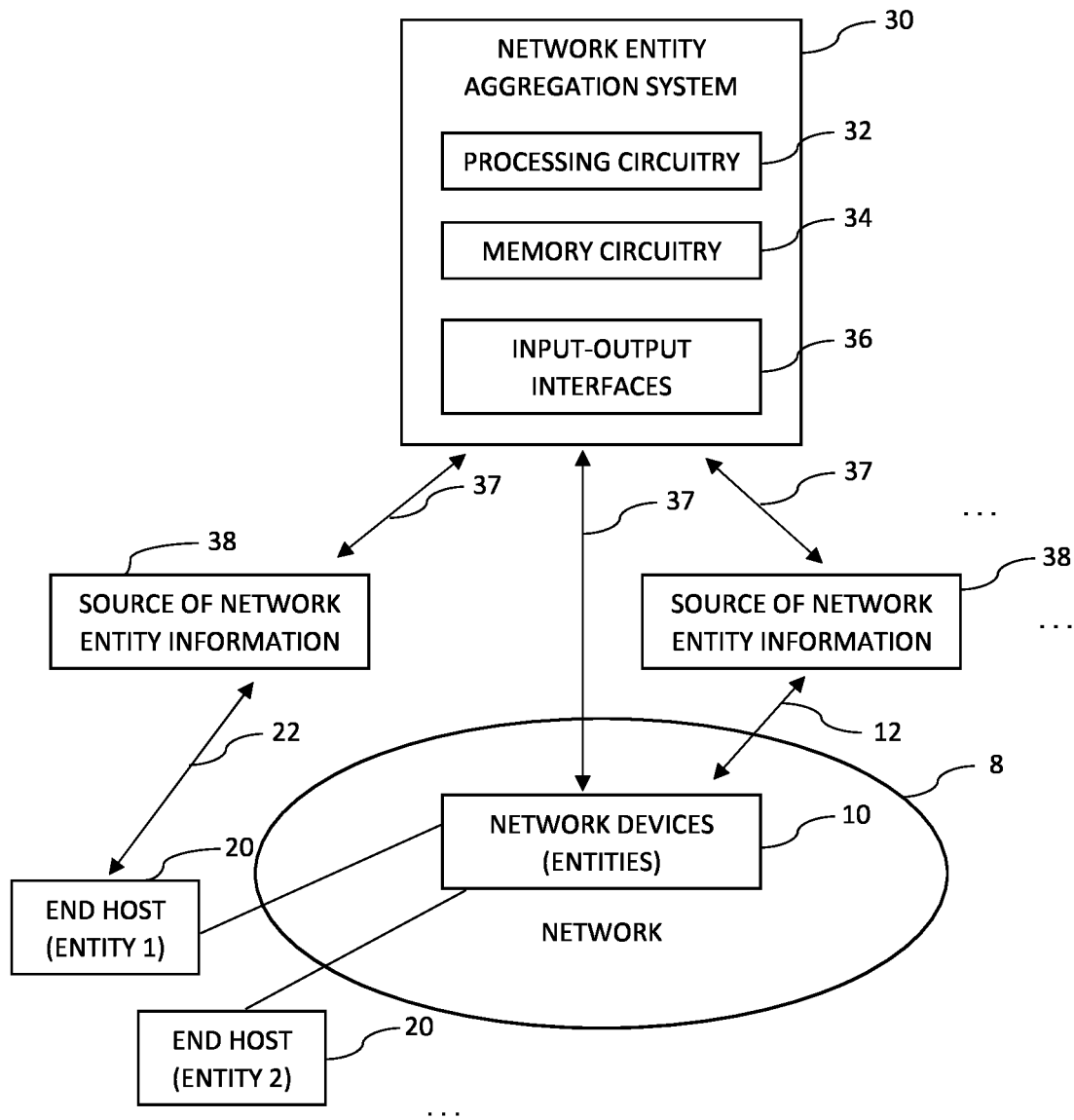
FIG. 1 is a diagram of an illustrative network coupled to a network entity aggregation system in accordance with some embodiments.

A network can convey network traffic, e.g., in the form of frames, packets, etc., for end hosts. The network can include various network entities such as end hosts from which network traffic is sourced and to which network traffic is destined and network devices that forward the network traffic. Various sources of network entity information gather information about the network entities. However, because the network entity information is often gathered in different network portions, based on different network protocols, and/or generally includes different types of information (e.g., even for the same entity), it may be difficult to provide a coherent view of the network entities within the network.

Accordingly, a networking system may be provided with a network entity aggregation system that aggregates information from multiple sources of network entity information. As examples, the sources may include databases for network analysis equipment, for network visibility equipment, and/or for other types of equipment for other network applications, may include packet recorders, sampled packet collectors, and/or other types of storage devices that store network traffic information (e.g., the sampled packet itself, consolidated versions of the packet, packet flow records, etc.), may include network devices, management or controller devices for the network devices, and/or other devices that facilitate operations of the network, may include management equipment for server equipment (e.g., virtual machines implemented on end host equipment) and/or other equipment that facilitate operations of the end hosts, and/or may include other types of devices and/or equipment. In particular, at least some of the sources may operate using different network protocols and therefore store different network protocol data (e.g., in the form of tables or other data structures).

Because these sources may store different pieces of information for different network entities (e.g., including different pieces of information for and therefore different representations of the same network entity). The network entity aggregation system may be configured to aggregate the different pieces of information (e.g., create a new unified network entity, combine information for the same network entity or otherwise reconcile multiple representations of the same network entity, etc.) to generate a list of unified network entities. The use of a network entity aggregation system (e.g., the generation of unified network entities and the maintenance of corresponding information about the unified network entities) can help provide a coherent global view of the network and its network entities, thereby enhancing visibility for the network.

The contexts and/or advantages described above are merely illustrative. If desired, any suitable system may employ the mechanism(s) described above and/or further detailed herein to aggregate network entity information and impart the above-mentioned and/or other advantages. An illustrative networking system that includes a network entity aggregation system is shown in FIG. 1.

In the example of FIG. 1, the networking system may include a network such as network 8. As examples, network 8 may include, be, and/or form part of one or more local segments, one or more local subnets, one or more local area networks, one or more campus area networks, a wide area network, etc. Network 8 may include any suitable number of different network devices 10 that convey network traffic between end hosts of network 8. At least some of network devices 10 may be connected by one or more wired technologies or standards such as Ethernet (e.g., using copper cables and/or fiber optic cables), thereby forming a wired network portion. If desired, network 8 may also include a wireless network portion extending from the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

Network 8 can include networking equipment forming a variety of network devices 10 that interconnect end hosts 20 of network 8. Network devices 10 may include one or more wireless access points, one or more switches (e.g., Layer 2 switches and/or Layers 2 and 3 switches), one or more bridges, one or more routers, one or more hubs, one or more repeaters, one or more firewalls, one or more devices serving other networking functions, one or more devices that include the functionality of two or more of these devices, and management equipment that manage and control the operation of one or more of these network devices.

End hosts 20 (sometimes referred to herein as end host devices, host devices, or host equipment) can include computers, servers, portable electronic devices such as cellular telephones, laptops, etc., any other suitable types of specialized or general-purpose host computing equipment, e.g., each running one or more client-side and/or server-side applications, network-connected appliances or devices such as cameras, thermostats, wireless sensors, medical or health sensors, or other sensors, lighting fixtures, speakers, printers, or other output devices, controllers or other input devices, and other network-connected equipment that serve as input-output devices and/or computing devices in a distributed networking system, devices used by network administrators (sometimes referred to as administrator devices), network service devices, management equipment that manage and control the operation of one or more of other end hosts 20 and/or network devices 10.

Network devices 10 and end hosts 20 may be referred to as network entities (e.g., entities of network 8). The example in which network entities include network devices 10 and end hosts 20 is merely illustrative. If desired, other devices and/or equipment operating within or using network 8 may similarly be considered network entities of network 8.

During the operation of network 8, various types of information may be generated for the various network entities (e.g., end hosts) in network 8. The different types of network entity information can often be generated based on different network protocols employed within network 8. Because network devices 10 are often responsible for handling network traffic conveyed in accordance with the network protocols and/or employ (e.g., enforce) the network protocols, configurations in which network devices 10 store the different network entity information are sometimes described herein as an illustrative example. If desired, other devices or equipment such as management systems for the end hosts (e.g., virtual machine(s) or other server management systems for server equipment implementing some end hosts 20) may also store network entity information.

In some scenarios, additional devices and/or equipment may be configured to gather the various types of network entity information from network devices 10. These additional devices and/or equipment may include host management equipment executing application(s) and/or service(s) that manage the configurations of host equipment (e.g., virtual machines) and that receive network entity information based on its management of host equipment, may include network management equipment executing application(s) and/or service(s) that communicate with network devices 10 to receive tables (or other data structures) storing network protocol information, network policy information, and/or other types of data containing network entity information, may include sampled network traffic collectors and/or network traffic recorders that receive network traffic processed by network devices 10 containing network entity information, as just a few examples.

Any of these devices and/or equipment may be referred to herein as a source of network entity information (e.g., source 38 in FIG. 1). In general, source 38 may include any device configured to store network entity information and from which network entity information may be received by system 30. In other words, sources 38 of network entity information may include databases for network analysis and visibility equipment (e.g., network analysis applications and/or network visibility applications running on server equipment), network traffic recorders (e.g., packet recorders), sampled network traffic collectors (e.g., sampled packet collectors), network devices 10 themselves, management or controller equipment for network devices 10, management equipment for server equipment (e.g., virtual machines implemented on end host equipment) or more generally for host equipment, and/or other types of devices and/or equipment.

To enhance organization of the various types of network entity information and thereby provide improved network visibility (among other advantages), a network entity aggregation system 30 may be coupled to sources 38 of network entity information and/or to the entities of network 8 to obtain entity information about network entities of network 8. Configurations in which network entity aggregation system 30 is implemented (at least partly) using server equipment are sometimes described herein as an illustrative example. In general, system 30 may be configured on any suitable type of (specialized or general) computing equipment to implement the functions of network entity aggregation. If desired, system 30 may be implemented using one or more local dedicated aggregation devices each having separate processing circuitry, memory circuitry, input-output interfaces, etc., within a device housing.

Network entity aggregation system 30 may include processing circuitry 32 formed from any suitable number of compute devices (e.g., on the server equipment implementing system 30), may include memory circuitry 34 formed from any suitable number of storage devices (e.g., on the server equipment implementing system 30), may include input-output interfaces 36 such as interfaces formed from physical ports, and/or may include other components such as power management circuitry, thermal management circuitry, etc. When in configuration in which system 30 is at least partly implemented on server equipment, the server equipment may include server hardware such as one or more blade servers, one or more rack servers, and/or one or more tower servers. Configurations in which the server equipment includes one or more rack servers mounted to racks of one or more server chassis or enclosures are sometimes described herein as an illustrative example. The compute devices for processing circuitry 32 and/or the storage devices for memory circuitry 34 may be provided as part of the server hardware (e.g., as part of the rack servers).

Processing circuitry 32 (e.g., the compute devices of the server equipment) may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures. Memory circuitry 34 (e.g., the storage devices of the server equipment) may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry.

Input-output interfaces 36 may include different types of communication interfaces such as Ethernet interfaces (e.g., formed from one or more Ethernet ports), optical interfaces, Bluetooth interfaces, Wi-Fi interfaces, and/or other network interfaces for connecting system 30 to the Internet, a local area network, a wide area network, a mobile network, generally network device(s) in these networks, and/or other computing equipment (e.g., host equipment such as server equipment, user devices, etc.). As an example, some input-output interfaces 36 (e.g., those based on wired communication) may be implemented on physical ports (sometimes referred to as sockets). These physical ports may be configured to physically couple to and/or electrically connect to corresponding mating connectors of external components or equipment. Different ports may have different form-factors to accommodate different cables, different modules, different devices, or generally different external equipment. As another example, some input-output interfaces 36 (e.g., those based on wireless communication) may be implemented using wireless communication circuitry (e.g., antennas, transceivers, radios, etc.).

As shown in FIG. 1, system 30 may obtain (e.g., aggregate) network entity information about the various entities of network 8 from sources 38 of network entity information over communication links 37. Depending on the type of source 38, network entity information may reach system 30 in different manners.

As a first example, a first type of sources 38 may include a network management platform, a network analysis platform, a network security monitoring platform, and/or other platforms serving other types of network applications (e.g., implemented on server equipment or implemented as a dedicated management or controller device) that communicate, as part of the applications executing thereon, with network devices 10 via links 12 to obtain protocol tables (or protocol data in other data structures), network policy information, and/or other data containing network entity information. These platforms may store the obtained data at one or more databases for access by system 30 (e.g., link 37 may include communication paths between the one or more databases and system 30).

As a second example, a second type of sources 38 may include an end host server management platform (e.g., implemented on server equipment) such as a virtual machine management platform that communicates with end hosts 10 (e.g., server equipment) to assign or otherwise manage the end host server configurations (e.g., virtual machines implemented thereon) via links 22. By virtue of managing end host configurations, the end host management platform may store network entity information (e.g., end host entity configuration information). The end host server management platform may store the end host entity configuration information at one or more databases for access by system 30 (e.g. link 37 may include communication paths between the one or more databases and system 30).

As a third example, a third type of sources 38 may include network devices 10 that store protocol tables (or protocol data in other data structures), network policy information, and/or other data containing network entity information. Link 37 may include communication paths between system 30 and network devices 10. In other words, system 30 can directly obtain the stored data containing network entity information directly from these types of network devices 10 through these communication paths (e.g., without an intervening management platform).

Figure 2:
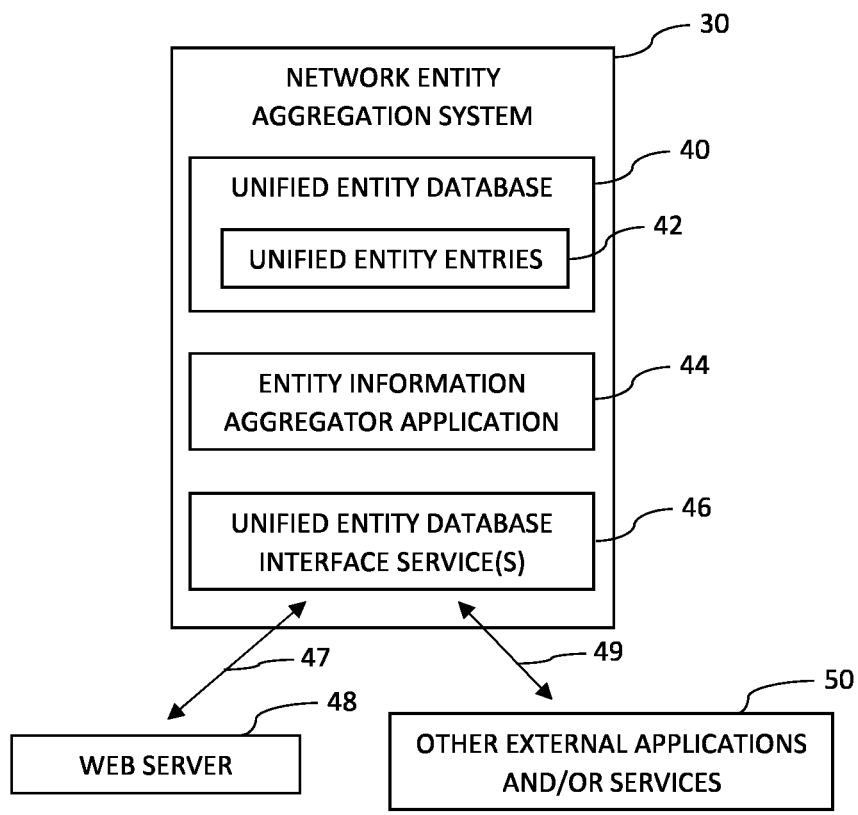
FIG. 2 is a diagram of an illustrative network entity aggregation system that includes various database(s), application(s), and/or service(s) in accordance with some embodiments.

Network entity aggregation system 30 may include different functional components that handle different parts of the network entity unification (e.g., aggregation) operation. FIG. 2 is a diagram of illustrative functional components within a network entity aggregation system such as system 30 in FIG. 1. As shown in FIG. 2. the network entity aggregation system may include one or more databases such as unified (network) entity database 40 storing unified (network) entity entries 42 each for a corresponding unified network entity, may include one or more applications such as entity information aggregator application 44, and/or may include one or more interfaces such as those provided by unified entity database interface service(s) 46.

Aggregator application 44 may perform different types of aggregation operations based on receiving entity information from data sources 38 in FIG. 1. As a result of the aggregation operations, aggregator application 44 may generate and maintain a list of unified network entities (e.g., represented as corresponding unified entity entries 42 in database 40). This list of entities (e.g., represented as entries 42) may be dynamically updated (e.g., in real-time as new data from sources 38 is periodically received by aggregator application 44). The list of unified network entities may be a consolidation of the different representations of the network entities obtained from data sources 38 (e.g., including modifications such as reconciliations for duplicative representations of the same network entity).

Interface service(s) 46 may provide interfaces such as application programming interfaces (APIs) to facilitate output of unified entity information and/or input of commands to modify the aggregation operations performed by aggregator application 44 and/or to modify the stored unified entity information at database 40. In other words, interface services 46 may access the contents of database 40 and provide the appropriate content for output and may convey received commands, requests, or other external inputs to aggregator application 44 and/or to use these external inputs to access (e.g., modify) the contents of database 40.

As some illustrative examples, interface service(s) 46 may output a list of unique entities in network 8 (e.g., a list of entities identified in database 40), details about one or more of the entities (e.g., details stored as part of the corresponding record or entry 42 of the one or more entities), and/or other information such as specific attributes of the entities to a web server such as web server 48. Web server 48 may present such information on one or more web pages for presentation to a user. The presentation of the information may include the information itself, may include graphical representations of the information, and/or may include other (e.g., filtered or otherwise altered) representations of the information. If desired, interface service(s) 46 may also output the same or other types of information to external applications or services 50 that further make use of the output unified entity information.

As additional illustrative examples, interface service(s) 46 may receive commands (e.g., a web server request based on a user search as received from server 48, an application request to obtain specific entity information as recited from application and/or services 50, etc.) to process (e.g., search, filter, alter, etc.) the unified entity information prior to output. The processed entity information may be output thereafter to the requesting server, application, and/or service. In other instances, service(s) 46 may receive commands (e.g., from a network administrator) to alter the aggregation scheme employed by aggregator application 44, to alter entries 42 stored in database 40, and/or to otherwise configure system 30.

By providing these interfaces to database 40 of unified entities and/or the entity aggregation process, system 30 enables external systems and/or users to access, query, obtain, and/or otherwise handle entity information in a unified form that would otherwise have only been separately accessible at the different sources. In other words, database 40 and the other components of system 30 unites information for each of these entities that when stored in different sources would often be uncorrelated with each other and allows external systems and/or users to interact with system 30 to access a universally (network-wide) applicable set of aggregated information. As such, the implementation of system 30 helps omit the need for multiple queries across different systems and/or sources, manual inspection and correlation of the query results, obtaining network-specific insights such as protocol-specific knowledge, network configuration, etc., and other burdensome tasks.

While software interfaces such as APIs are described to be formed using interface service(s) 46, these software interfaces are implemented using physical interface components (e.g., input-output interfaces 36) and by processing circuitry 32 executing software instructions stored on memory circuitry 34 (e.g., to provide the appropriate APIs). While APIs are sometimes described herein to facilitate input and output of information for system 30 in connection with FIG. 2, this is merely illustrative. If desired, other types of software and/or hardware interfaces may be provided to facilitate input and output of information for system 30.

In configurations described herein as an example, database 40, application 44, service(s) 46, and/or other functional elements of system 30 may be provided using processing circuitry 32, memory circuitry 34, and/or input-output interfaces 36 in FIG. 1. In particular, memory circuitry 34 may include one or more non-transitory (tangible) computer-readable storage media that store operating system software and/or any other software code, sometimes referred to as program instructions, software, data, instructions, or code. Processing circuitry 32 may run (e.g., execute) an operating system and/or other software/firmware that is stored on memory circuitry 34 to perform desired operations of system 30 (e.g., the operations for managing database 40 in FIG. 2, the operations of aggregator application 44 in FIG. 2, the operations of interface service(s) 46 in FIG. 2, etc.). In such a manner, system 30 may implement one or more services, one or more applications, one or more software servers, and/or other software features to collectively perform the functions of system 30 and/or the functions of other servers implemented thereon. As described herein, a server generally refers to the underlying server (hardware) equipment and/or the server software (e.g., databases, services, applications, etc.) executed thereon to perform the operations of the server.

More specifically, database 40 of system 30 may be stored on a portion of memory circuitry 34 of system 30. Software instructions for performing the operations of application 44 and service(s) 46 and more generally for performing the operations of system 30 (as described herein) may be stored on a portion of memory circuitry 34 of system 30 and may be executed by processing circuitry 32 of system 30 to perform these operations.

While entity information aggregator application 44 and unified entity database interface services 46 are described herein to perform respective parts of the network entity unification operation (e.g., entity information aggregation operation) for system 30, this is merely illustrative. Processing circuitry 32 of system 30 may be organized in any suitable manner (e.g., to have any other applications and/or services instead of or in addition to aggregator application 44 and/or interface services 46) to perform each part of the network entity unification operation. Accordingly, processing circuitry 32 may sometimes be described herein to perform the network entity unification operation instead of specifically referring to the one or more applications and/or services executed by processing circuitry 32.

Figure 3:
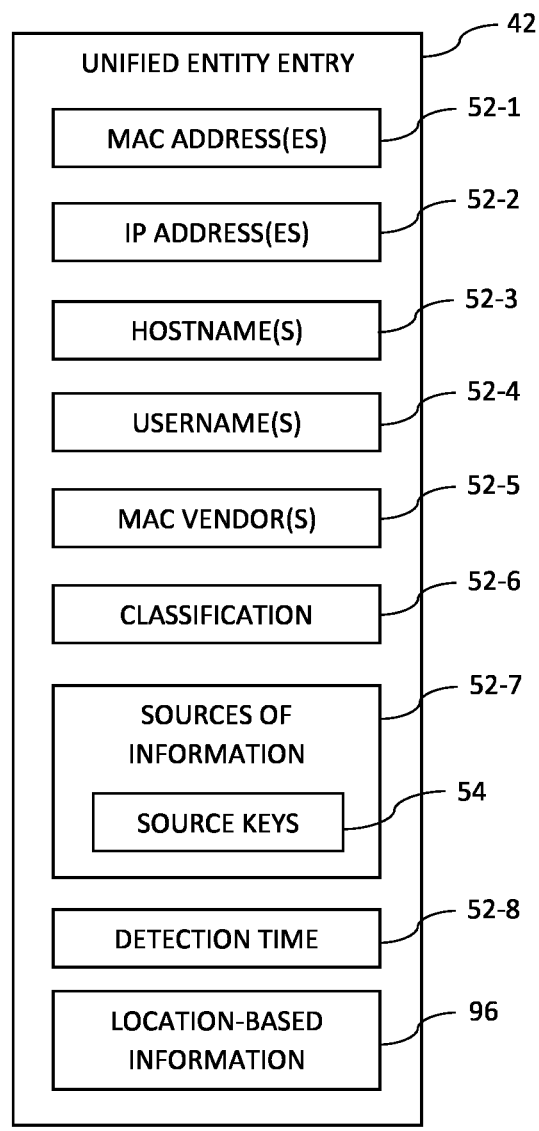
FIG. 3 is a diagram of an illustrative unified network entity record in accordance with some embodiments.

The entries 42 (sometimes referred to herein as records 42) of database 40 may be organized in any suitable format (e.g., table(s), list(s), and/or other data structures) to contain the desired information for each unified entity. FIG. 3 is a diagram of illustrative information that may be included within a unified entity entry such as unified entity entry 42 in database 40 of FIG. 2.

In the example of FIG. 3, unified entity entry 42 may include various attributes 52 or types of entity information for the same network entity such as one or more Media Access Control (MAC) addresses 52-1, one or more Internet Protocol (IP) addresses 52-2 (e.g., IP version 6 (IPv6) addresses and/or IP version 4 (IPv4) addresses), one or more hostnames 52-3, one or more other types of entity identifiers, one or more usernames 52-4, one or more MAC vendors (e.g., one or more manufacturers of the device(s) associated with the entity as identified by the MAC address attribute), entity classification information 52-6, one or more sources 52-7 (e.g., sources 38 in FIG. 1) of the other information in entry 42 (e.g., associations between a source 52-7 and the attributes in entry 42 for which it is a source), temporal information such as detection time information 52-8 (e.g., a time at which the entity is first detected on network 8, a time at which system 30 detected the entity, and/or times at which the sources 52-7 detected the entity).

If desired, each source 52-7 may be associated with a corresponding source key 54, which may be stored as part of entry 42 (e.g., as part of source (information) 52-7). The source key 54 for a particular source of entity information may serve as the entity identifier when performing a lookup operation for the entity at or otherwise communicating about the entity with the source. In different contexts (e.g., depending on the device type of source, the protocols employed by the source, and/or the functions of the source, etc.), a different key may be used to identify the entity at different source(s). As examples, a device name (or host name) of the entity may be the source key for some sources, a MAC address of the entity may be the source key for some sources, an IP address of the entity may be the source key for some sources, a Universal Unique Identifier (UUID) of the entity may be the source key for some sources, and/or other identifiers (or combination of identifiers) may be the source key(s) for some sources. If desired, source keys 54 may be stored and used by system 30 (or output to a user or external system for use) to exchange information or otherwise identify the entity when communicating with the corresponding source.

If desired, unified entity entry 42 may include (network) location-based attributes such as (network) location-based information 96. Details about location-based information 96 are described in connection with FIG. 9. In general, location-based attributes such as information 96 may include any suitable information indicative of the placement of the unified entity within the network and/or relative to other network elements (e.g., relative to a port of a network device, relative to neighboring network devices, relative to one or more other network element, etc.).

These types of information in FIG. 3 that may be stored in the record (e.g., in entry 42) for a given unified entity are merely illustrative. If desired, some of these types of information may be absent from the record (e.g., no information is gathered for that particular entity attribute) and/or additional types of information (e.g., customized information based in user or network administrator customization) may be included in the record.

If desired, any information in entry 42 for a unified entity may include historical data or a time-series of the data for the information such as historical data of each of attributes 52 (e.g., indicative of how the attribute(s) of the unified entity has changed or not changed over time).

In general, different sources 38 may each provide one or more attributes 52 for a single entity. In some instances, different sources 38 may provide the same information for a given attribute 52 of a given unified entity (e.g., the same MAC address, the same IP address, the same hostname, the same username, etc.), which may increase the confidence of the different sources 38 referring to the same network entity (albeit in different representations). In some instances, different sources 38 may provide different information for a given attribute 52 of a given unified entity (e.g., different MAC addresses, different IP addresses, different hostnames, different usernames, etc.), which may help consolidate the different entity representations (e.g., evidenced by different MAC addresses, different IP addresses, different hostnames, different usernames, etc.) into a single record for the same unified entity.

As an example, a first source 38 may provide a MAC address and a first IP address (among other information) for a particular network entity as entity information to system 30 and a second source 38 may provide the same MAC address but a different second IP address (among other information) for a particular network entity as entity information to system 30. System 30 may determine that the network entity referred to by the first and second sources 38 are different representations of the same network entity based on the same MAC address obtained from the two different sources 38 and create a single record 42 for this same (unified) network entity that contains both the first and second IP addresses (e.g., as attribute 52-2).

Figure 4:
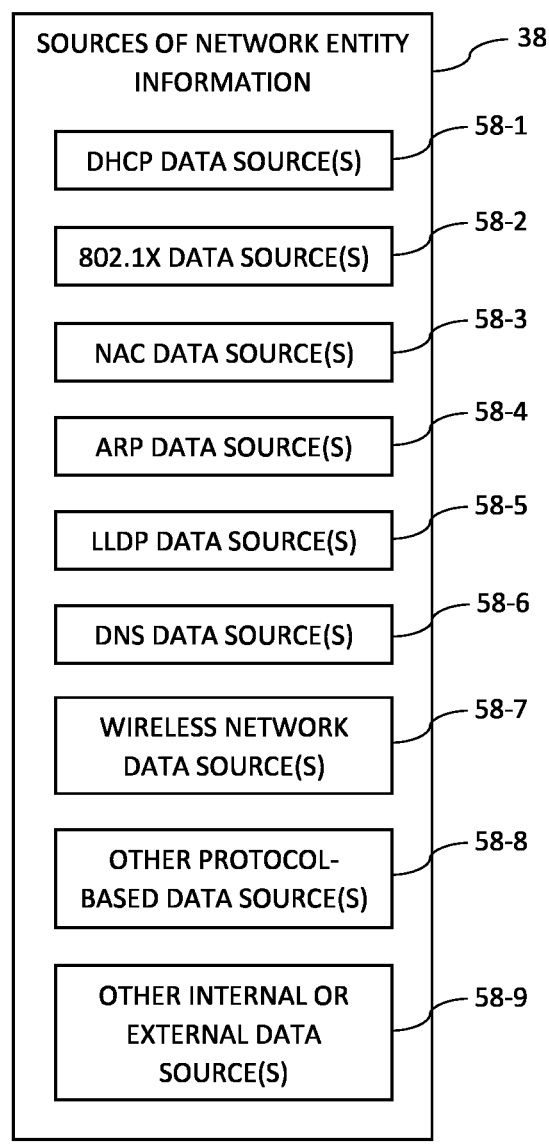
FIG. 4 is a diagram of illustrative sources of network entity information in accordance with some embodiments.

To populate and generally maintain entity information in each entry 42, network entity aggregation system 30 may receive entity information from a variety of data sources conveying different types of information. The use of different types of entity information may help provide a more comprehensive view of the network entity in its many operational contexts within the network. FIG. 4 is a diagram of illustrative types of data sources (e.g., sources 38) from which corresponding types of data are obtained by an entity information aggregator application (e.g., application 44 in FIG. 3) for aggregation, consolidation, and/or unification.

In the example of FIG. 4, network entity information is defined and organized based on the function of the data (e.g., its use and association with different protocols, with different network functions, with different types of network portions, etc.), rather than the specific device or equipment from which the data is obtained (e.g., in the view illustrated in FIG. 1). Accordingly, the same device and/or equipment (e.g., the same device 10 of FIG. 1) may provide multiple types of data (e.g., serve as multiple data sources, or put another way, serve as a source of multiple types of data). Additionally, different devices and/or equipment (e.g., two different network devices 10 of FIG. 1) may each provide the same type of data (e.g., serve as two data sources of the same type of data).

As shown in the example of FIG. 4, sources 38 may include one or more Dynamic Host Configuration Protocol (DHCP) data sources 58-1, one or more IEEE 802.1X data sources 58-2, one or more other network access control (NAC) data sources 58-3, one or more Address Resolution Protocol (ARP) data sources 58-4, one or more Link Layer Discovery Protocol (LLDP) data sources 58-5, one or more Domain Name System (DNS) data sources 58-6, one or more wireless network (e.g., IEEE 802.11 such as Wi-Fi) data sources 58-7, one or more other protocol-based data sources 58-8, and/or one or more other data sources 58-9 (internal or external to system 30). In particular, other sources 58-9 may include systems or platforms that are communicatively coupled to network 8 and that manage or otherwise interact with the network devices and/or end hosts of network 8 to serve particular functions (e.g., a security function, a network access control function, a user identity provider function, etc.).

Some of these data sources may generate, store, and/or use protocol-based tables (or generally databases) and/or other types of data that facilitate performance of the corresponding operations specified by the network protocol (e.g., by DHCP, IEEE 802.1X, ARP, LLDP, DNS, etc.). Some of these data sources may generate, store, and/or use a list of devices and corresponding network access profiles and/or other network access control information (e.g., in the case of IEEE 802.1X and/or other NAC data sources). Some of these data sources may generate, store, and/or use a list of wireless client devices and corresponding wireless network access profiles and/or other wireless network connectivity information (e.g., in the case of wireless network data sources). Some of these data sources may serve as aggregators of specific types of information (e.g., a data source for a specific type of data may receive and store information of the same data type, such as DHCP data, 802.1X data, etc., received from different network devices. Configurations in which one or more user and/or network management systems (e.g., implemented on server equipment and configured to manage the operations of network 8 including network devices 10) form at least some of the types of data sources in FIG. 4 are sometimes described herein as an illustrative example. In particular, one or more management systems may each provide DHCP data (serving as source 58-1), IEEE 802.1X data (serving as source 58-2), NAC data (serving as source 58-3), ARP data (serving as source 58-4), LLDP data (serving as source 58-5), DNS data (serving as source 58-6), wireless network data (serving as source 58-7), other network-protocol-based data (serving as source 58-8), and/or other network user data, network security data, network services data, etc. (serving as source 58-9).

As an illustrative example, aggregator application 44 may receive (e.g., through interfaces formed by services 46) DHCP information such as information in the messages exchanged based on DHCP as forwarded by DHCP relays (e.g., network devices 10 serving as DHCP sources 58-1) and/or information maintained in server equipment implementing a DHCP server (e.g., the server equipment serving as DHCP source 58-1). These DHCP sources may provide entity information such as MAC address 52-1, hostname 52-3, MAC vendor 52-5, device classification information 52-6, and other entity information for storage in entry 42.

As another illustrative example, aggregator application 44 may receive (e.g., through interfaces formed by services 46) 802.1X information based on which network entities are authorized for network access such as information maintained at local 802.1X tables of network devices 10 (e.g., network devices 10 serving as 802.1X sources 58-2) and/or information maintained in server equipment that aggregate the 802.1X information (e.g., the server equipment serving as 802.1X source 58-2). These 802.1X sources may provide entity information such as MAC address 52-1, IP address 52-2, username 52-4, and other entity information (e.g., user identity information, authentication status and mode information, etc.) for storage in entry 42.

As yet another illustrative example, aggregator application 44 may receive (e.g., through interfaces formed by services 46) wireless client information such as information generated and/or maintained at wireless access points (e.g., network devices 10 serving as wireless network data sources 58-7) and/or information maintained in server equipment that aggregate the wireless client information (e.g., the server equipment serving as wireless network data source 58-7). These wireless client sources may provide entity information such as MAC address 52-1, IP addresses 52-2, hostname 52-3, username 52-4, and other entity information (e.g., user identity information, name of the wireless access point to which the entity is connected, SSID (service set identifier) of the wireless access point to which the entity is connected, etc.) for storage in entry 42.

These examples are merely illustrative. If desired, aggregator application 44 may receive other types of entity information from other types of sources. As additional examples, aggregator application 44 may receive ARP information such as information maintained at local ARP tables of network devices 10 (e.g., serving as ARP sources 58-4) containing IP address to MAC address mappings (e.g., IP address, MAC address, VRF (virtual routing and forwarding) name), may receive DNS information such as information maintained at server equipment (e.g., server equipment serving as DNS source 58-6) storing IP address to hostname mappings, may receive host information such as virtual machine information maintained at server equipment (e.g., virtual machine management system serving as an external data source 58-9), may receive host information such as container information maintained at server equipment (e.g., container management system serving as an external data source 58-9), and/or any other suitable entity information.

Figure 5:
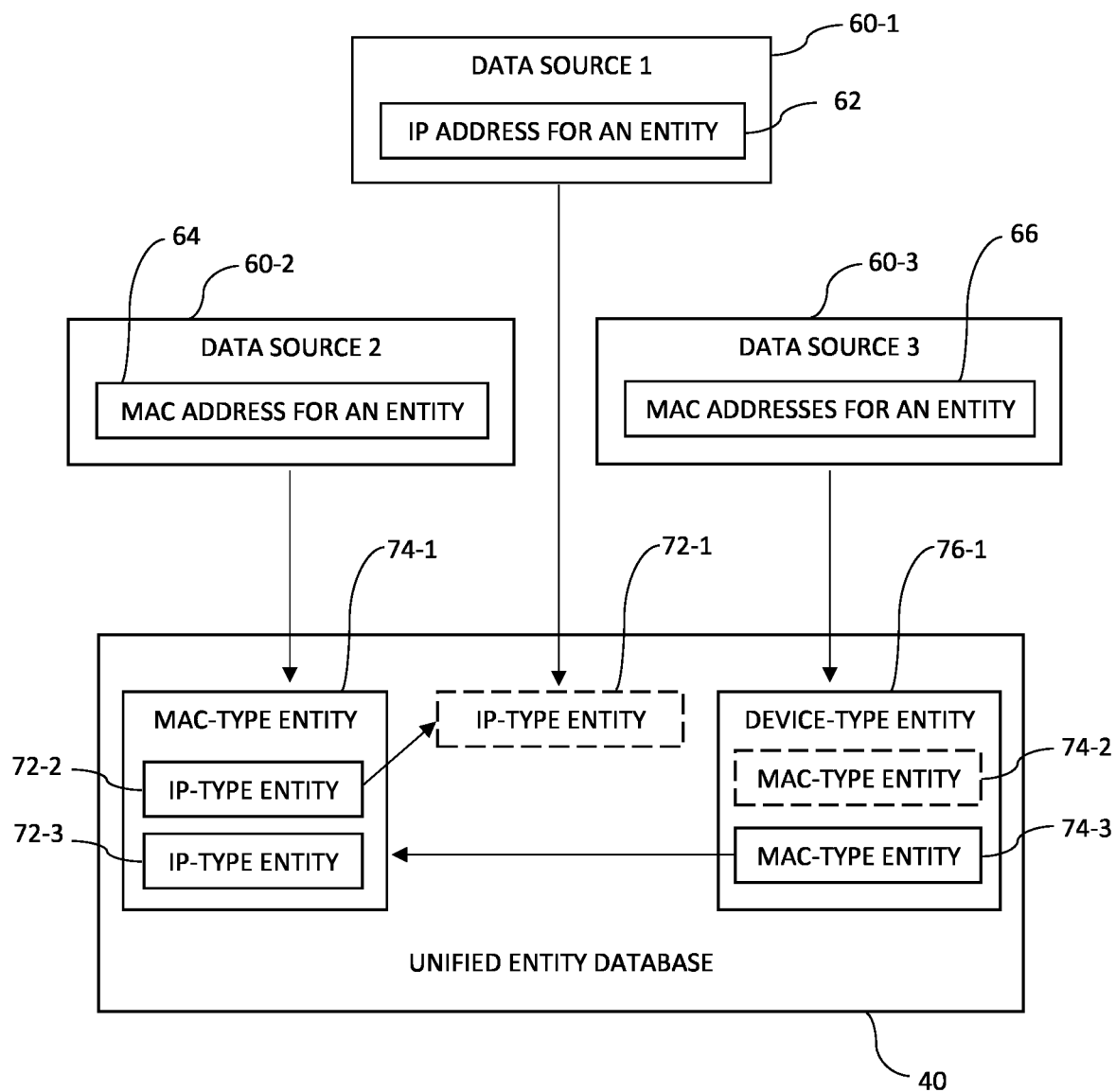
FIG. 5 is a diagram of illustrative types of network entities for which entity records are maintained in accordance with some embodiments.

The data sources 58 may each provide one or more attributes 52 (FIG. 3) for unified entity entries 42. More common attributes such as MAC addresses and IP addresses may be provided by many types of data sources 58, while less common attributes such as usernames and certain levels of classification information may be provided by fewer types of data sources 58. By collectively using the information for entity attributes collected across these types of data sources, system 30 (e.g., entity information aggregator application 44) may maintain records at a database (e.g., entries 42 at database 40) for unified entities. There may be multiple types of unified entities for which records are maintained at the database. FIG. 5 is a diagram of illustrative types of unified entities that may be identified and maintained by aggregator application 44 and for which corresponding records (e.g., entries 42) are stored in database 40.

In particular, records for three illustrative hierarchical types of (unified) entities that may be stored in database 40 are shown in FIG. 5. As a first example, application 44 may aggregate entity information from data sources 38 to generate a first record (e.g., entry 42) for storage at database 40 corresponding to an IP-type entity 72-1. IP-type entities may each be associated with (e.g., only) a single IP address for the corresponding IP-type entity. As shown in FIG. 5, a first data source 60-1 (or set of data sources) such as one or more of data sources 38 in FIGS. 1 and 4 may supply an IP address 62 for a network entity identified by source 60-1. Application 44 may aggregate all of the information for the network entity and determine that a single IP address 62 is associated with the entity and therefore maintain a record for the IP-type entity 72-1 at database 40 (e.g., the record including the single IP address 62 and any other aggregated entity information as described in connection with FIG. 3).

As a second example, application 44 may aggregate entity information from data sources 38 to generate a second record (e.g., entry 42) for storage at database 40 corresponding to a MAC-type entity 74-1. MAC-type entities may each be associated with (e.g., only) a single MAC address (and multiple IP addresses) for the corresponding MAC-type entity. As shown in FIG. 5, a second data source 60-2 (or set of data sources) such as one or more of data sources 38 in FIGS. 1 and 4 may supply a MAC address 64 for a network entity identified by source 60-2. Application 44 may aggregate all of the information for the network entity and determine that a single MAC address 64 is associated with the entity and therefore maintain a record for the MAC-type entity 74-1 at database 40 (e.g., the record including the single MAC address 64 and any other aggregated entity information as described in connection with FIG. 3). If desired, the record for the MAC-type entity 74-1 may include multiple (e.g., two) IP addresses and may therefore include corresponding IP-type (sub-)entities such as IP-type (sub-)entities 72-2 and 72-3 of the main MAC-type entity 74-1.

As a third example, application 44 may aggregate entity information from data sources 38 to generate a third record for storage at database 40 corresponding to a device-type entity 76-1. Device-type entities may each be associated with multiple MAC addresses for the corresponding device-type entity. As shown in FIG. 5, a third data source 60-3 (or set of data sources) such as one or more of data sources 38 in FIGS. 1 and 4 may supply multiple MAC addresses 66 for a network entity identified by source 60-3. Application 44 may aggregate all of the information for the network entity and determine that multiple MAC addresses 66 are associated with the entity and therefore maintain a record for the device-type entity 76-1 at database 40 (e.g., the record including the multiple MAC addresses 66 and any other aggregated entity information as described in connection with FIG. 3). Because the record for the device-type entity 76-1 includes multiple (e.g., two) MAC addresses, the device-type entity 76-1 may include corresponding MAC-type (sub-)entities such as MAC-type (sub-)entities 74-2 and 74-3 of the main device-type entity 76-1.

If desired, a record (e.g., entry 42) in database 40 for a given entity type may be converted to a record (e.g., entry 42) of a different entity type during the lifetime of the entity and/or sub-entities. As examples, some entities may be merged into other entities as sub-entities and removal of certain sub-entities may result in the persistence of other sub-entities (e.g., remaining as sub-entities or promoted as a main entity). In particular, in some instances as illustrated in FIG. 5, the record of entity 72-1 may be combined into the record for entity 74-1 upon determining the IP address of entity 72-1 matches that of (sub-)entity 72-2 of main entity 74-1.

In some instances as further illustrated in FIG. 5, (sub-)entity 74-2 may be removed from the record of main entity 76-1 (e.g., upon determining that the device-type entity no longer includes the MAC-type sub-entity 74-2 and is no longer associated with the MAC address of sub-entity 74-2). Accordingly, the remaining MAC-type sub-entity 74-3 may be promoted to a new main MAC-type entity (e.g., entity 74-1) and may accordingly be stored as part of a new record for the new main MAC-type entity. In other words, the record of device-type entity 76-1 containing MAC-type (sub-)entities 74-2 and 74-3 may be converted into a record of MAC-type entity 74-3 (e.g., upon removal of all other MAC-type entities from the record for entity 76-1).

Based on the different types of entities identified by records in database 40, system 30 (e.g., application 44 and/or service(s) 46) may provide unified entity information for output to a user and/or to other external applications and/or services. In particular, the unified entity information may be usable (e.g., by the user, the external applications and/or services, or by applications and/or services in system 30) to generate enhanced network flow information. Whereas network flow information is typically generated and/or collected for each source IP-address and destination IP-address pair (e.g., from one IP-type entity to another, also including source and destination port numbers and protocol), the use of unified entity information may further facilitate the generation and/or collection of network flow information for a device-type entity to device-type entity pair, for a MAC-type entity to MAC-type entity pair, or generally between a pair of hosts each containing multiple IP addresses.

Figure 6:
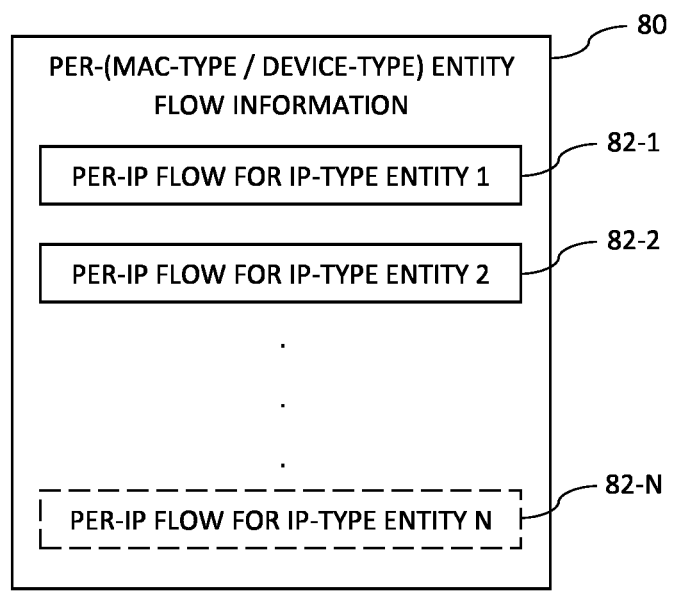
FIG. 6 is a diagram of illustrative flow information that may be generated for a unified network entity in accordance with some embodiments.

FIG. 6 is a diagram of illustrative per-unified-entity flow information that contains flow information for multiple IP-type entities belonging to the same unified entity such as a MAC type-entity or a device-type entity. In particular, flow information 80 for a unified entity (e.g., as the source entity of one or more network flows in the example of FIG. 6) can include flow information for multiple IP-type entities 1, 2, . . . , N belonging to the unified entity as described in the hierarchical types of entities in FIG. 5. Because system 30 stores a record of the main entity (e.g., a main MAC-type entity or a main device-type entity) and its association with IP-type sub-entities, corresponding flow information such as 82-1, 82-2, . . . , 82-N for the IP-type sub-entities of a main entity may be more easily identified and associated as the flow information 80 for the main entity.

If desired, system 30 may store global tables at database 40 and/or at other databases stored on memory circuitry 34. In particular, as part of the entity information aggregation process, aggregator 44 may obtain numerous types of tables originally stored locally at different network devices (e.g., network devices 10 in FIG. 1). To extract the entity information for each type of table, aggregator 44 may first aggregate each type of information in the local tables into a corresponding global table. While information is described herein to be presented in the form of tables, this is merely illustrative. In general, tables and their contents as described herein may be organized in any suitable manner (e.g., using any suitable data structure).

Figure 7:
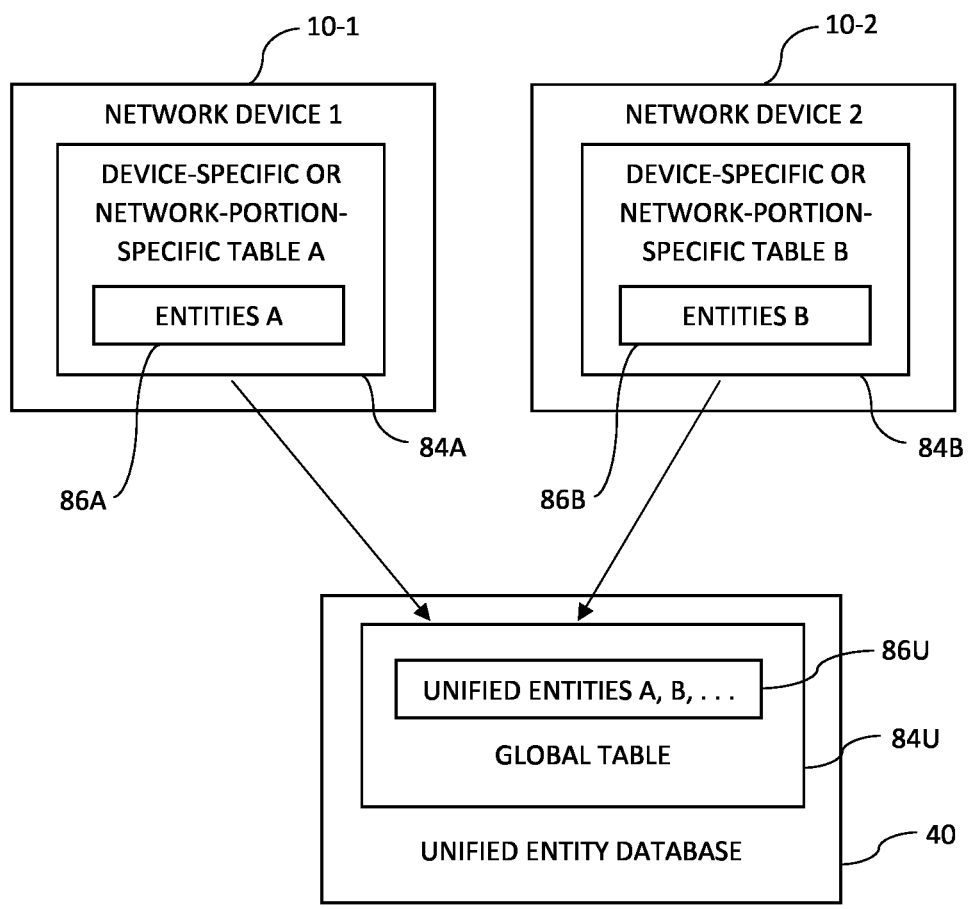
FIG. 7 is a diagram of illustrative global information that may be consolidated from local information at various network devices in accordance with some embodiments.

FIG. 7 is a diagram of illustrative consolidation of device-specific tables or data into a global version of the tables and reconciliation of entities (if needed). In particular, system 30 (e.g., entity information aggregation application 44) may perform consolidation for ARP table(s), IEEE 802.1X entities table(s) or other types of network access control tables, wireless network client table(s), as just a few examples.

As shown in FIG. 7, a first network device 10-1 (e.g., memory circuitry thereon) may store a first local table such as device-specific or network-portion-specific table 84A and a second network device 10-2 (e.g., memory circuitry thereon) may store a second local table such as device-specific or network-portion-specific table 84B. Table 84A may include table entries that identify a first set of entities 86A and table 84B may include table entries that identify a second set of entities 86B.

As part of the aggregation process performed by application 44, application 44 may receive tables 84A and 84B, table entries and/or other information within tables 84A and 84B, entity information of entities 86A and 86B as present in tables 84A and 84B, other entity information associated with entities 86A and 86B, and/or other information maintained at devices 10-1 and 10-2. System 30 (e.g., application 44) may receive the information directly from network devices 10-1 and 10-2 (e.g., devices 10-1 and 10-2 may serve as sources 38 in FIG. 1) or may receive the information from devices 10-1 and 10-2 through intervening sources 38 (e.g., server equipment configured to collect table information and/or other data from network devices).

Entity information aggregator application 44 may consolidate the respective entity information contained in corresponding tables 84A and 84B to generate a global table 84U. As part of this process, application 44 may also unify entities 86A and 86B into a set of unified entities 86U. This unification process may include reconciling instances of the same entity being stored on both tables 84A and 84B (e.g., by combining the separate information of the same entity and associating the combined information with the resulting unified entity). Application 44 may similarly reconcile instances of the same table entries being stored on both tables 84A and 84B before storing the resulting entries in the global table.

In such a manner, application 44 may obtain and store, in database 40, a resulting global ARP table (e.g., indicating all IP address to MAC address mappings in network 8), a resulting global IEEE 802.1X entities table (e.g., indicating all authenticated entities in network 8), and/or a resulting global wireless network client (entities) table (e.g., indicating all wireless clients connected to network 8). These resulting global tables may help provide a clear network-wide view of the entities on the network by network protocol (e.g., ARP, IEEE 802.1X, etc.), by a networking function (e.g., network access control entities), and/or a type of entities (e.g., wireless network client device entities). Service(s) 46 may supply these tables, the content therein, graphical content based on the content in the tables, and/or other global information indicated by these global tables as output to web server 48 (e.g., to be presented on one or more web pages) to other applications and/or services for any suitable functions (e.g., to NAC servers for verification of NAC policies, to RADIUS servers for verification of wireless client devices, etc.).

Figure 8:
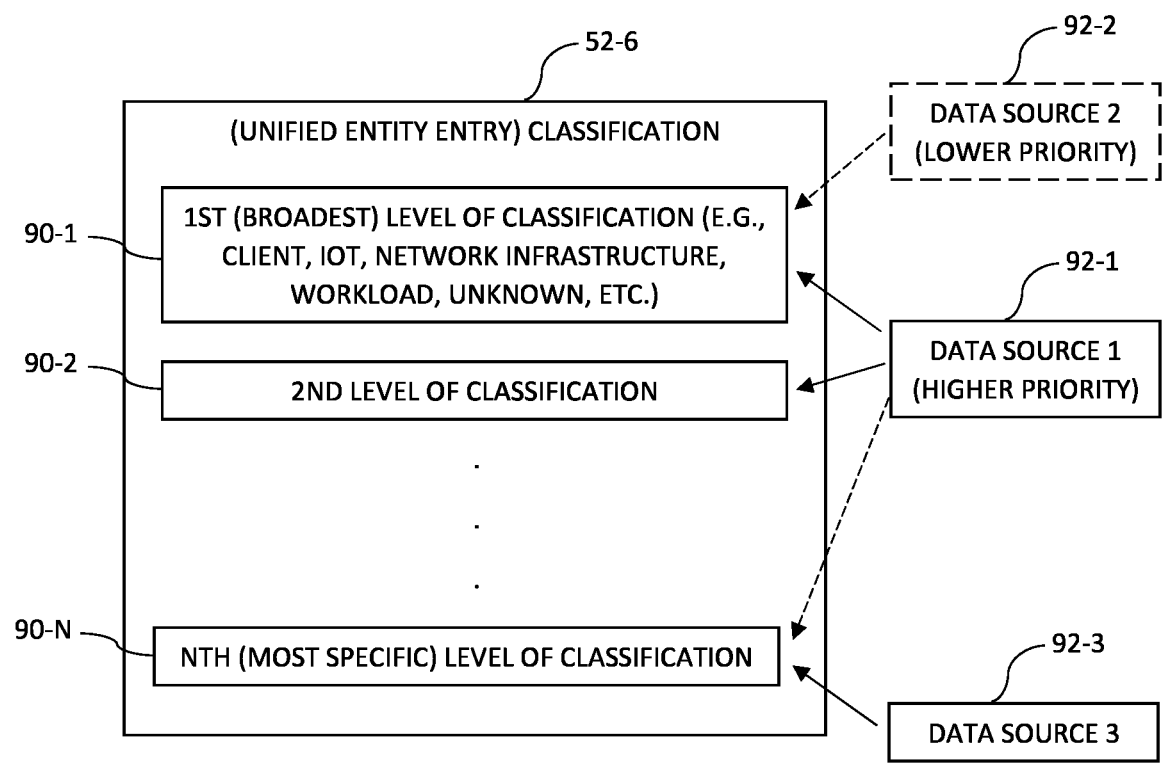
FIG. 8 is a diagram of illustrative levels of classification information maintained for a unified network entity in accordance with some embodiments.

As described in connection with FIG. 3, each record or entry 42 may store corresponding classification information 52-6 about the respective unified entity. In some illustrative examples, classification information 52-6 may include classification information at different hierarchical levels. FIG. 8 is a diagram of illustrative levels of classification for each unified entity (e.g., being stored as part of its entry 42 in database 40).

As shown in FIG. 8, classification information 52-6 for a given entity entry may include any suitable levels of classification such as a first level of classification 90-1, a second level of classification 90-2, . . . , and an Nth level of classification. The first level of classification 90-1 may include classifications that each encompass the largest number of network entities and may therefore be the most general or broadest level of classification. The Nth level of classification may include classifications that each encompass the smallest number of network entities (with respect to classifications of higher levels) and may therefore be the most specific level of classification. In other words, the levels of classification from the first level to the Nth level may have increasing specificity.

In one illustrative configuration described herein as an example, the first level of classification 90-1 may indicate whether the entity is a client entity (e.g., a user device, an administrator device, and/or other types of devices configured to interface with a user or network administrator), an Internet-of-Things entity (e.g., a sensor, an appliance, a medical device, and/or other types of devices configured to interact with the environment), a network infrastructure entity (e.g., network devices), a workload entity (e.g., compute and/or storage devices on server equipment), or an unknown entity. From this broadest level of classification, more and more specific classifications may be associated with the unified entity.

Consider, as an example, classification information 52-6 in an entry 42 for a particular cellular telephone on the network as the unified entity identified by the entry 42. The broadest classification may be a client classification (e.g., included in the first level of classification 90-1), the following level of classification may be a cellular telephone classification (e.g., included in the second level of classification 90-2), the following level of classification may be a classification indicative of the specific vendor or manufacturer of the cellular telephone (e.g., in the third level of classification), and the last level of classification may be a classification indicative of the model of the specific vendor or manufacturer of the cellular telephone (e.g., in the fourth or Nth level of classification). This example, including the number, type, and/or other characteristics of the levels of classification, is merely illustrative. If desired, other types of classifications may be used to hierarchically classify all network entities on the network.

Similar to other information contained within a unified entity entry, classification information 52-6 may also be obtained (e.g., by application 44 through interfaces provided by services 46) from one or more sources 38 of entity information. In some configurations described herein as an example, application 44 may obtain (e.g., directly, by inference, by lookup in corresponding databases, and/or by other operations) multiple levels of classification information from a given data source 92-1 (e.g., one of sources 38 in FIGS. 1 and 4). As an example, based on the type of data source 92-1 and/or the entity information provided by data source 92-1, application 44 may directly obtain some classification information (e.g., the first and second levels of classification information 90-1 and 90-2), and/or based on the entity information provided by data source 92-1 and processing of the entity information, application may obtain other classification information (e.g., the Nth level of classification information 90-N).

In some instances, multiple data sources such as data sources 92-1 and 92-2 may both provide the entity information for the same level of classification. If the entity information provided by different sources is different or otherwise conflict, the entity information provided by a data source such as data source 92-1 (e.g., indicated to application 44 to be of higher priority, to contain higher confidence level information, and/or to provide more detailed or specific entity information) may be used by application 44 instead of a data source of lower priority such as data source 92-2 to populate that level of classification information (e.g., classification information of level 90-1 in the example of FIG. 8).

In some instances, one or more data sources may provide entity information to fill in gaps in the levels of classification left by the entity information received from one or more other data sources. As an example, application 44 may receive entity information from both data sources 92-1 and 92-3 and may populate classification information at levels 90-1 and 90-2 based on entity information from data source 92-1 and may populate classification information at level 90-N based on entity information from data source 92-3.

Figure 9:
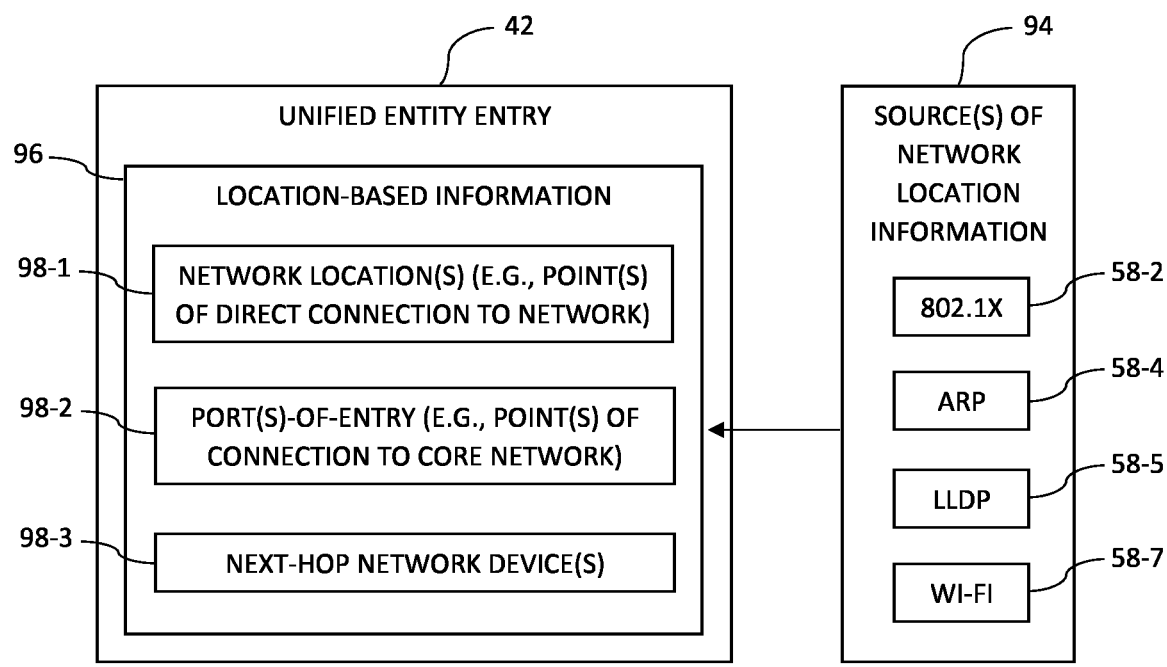
FIG. 9 is a diagram of illustrative network-location-based information maintained for a unified network entity in accordance with some embodiments.

In one illustrative configuration described herein as an example, one or more unified entity entries 42 in database 40 may also include location-based attributes or location-based information (e.g., in addition to the types of information described in connection with FIG. 3). FIG. 9 is a diagram of different illustrative location-based information that can be received by system 30 (e.g., by entity information aggregator application 44) from different sources of location information and aggregated to populate part of unified entity entry 42.

In the example of FIG. 9, application 44 may aggregate entity information and populate entry 42 with one or more network location(s) 98-1 of the unified entity. These one or more network locations may be indicative of the point(s) of direct connection to the network by the entity. In particular, network locations 98-1 may identify edge network devices (e.g., some of network devices 10 in FIG. 1) and corresponding ports of the edge network devices connected to the entity by a cable (e.g., without any intervening network device or forwarding device). In other instances where a network has a wireless edge portion and the edge devices include wireless devices such as wireless access points, network locations 98-1 may identity the wireless access point, the service set identifier, and/or other attributes about the wireless connection through which the unified identity is directly connected (wirelessly) to the network. As described herein, the direct connection to the network may include a wired or wireless connection of an entity to the edge of the network (without any intervening network devices).

Application 44 may aggregate entity information and populate entry 42 with port(s)-of-entry 98-2 of the unified entity. One or more port(s)-of-entry 98-2 may be indicative of point(s) of connection to the core network (e.g., the core portion of the network or the core infrastructure of the network). In particular, ports-of-entry 98-2 may identify network devices (e.g., some of network devices 10 in FIG. 1) in the core network and corresponding ports of the core network devices connected to the entity by intervening (edge) network devices (e.g., some of network devices 10 in FIG. 1).

Application 44 may aggregate entity information and populate entry 42 with a list of one or more next-hop network device(s) 98-3 (e.g., some of network devices 10 in FIG. 1) or otherwise identify one or more next-hop network device(s) 98-3. Next-hop network devices 98-3 may include forwarding devices that are the first network devices in the network to handle (e.g., process) traffic from the entity (e.g., is one hop away from the entity).

As shown in FIG. 9, application 44 may aggregate entity information, or more specifically, entity network location information from one or more sources 94 to populate the different location-based information in entry 42 (e.g., network locations 98-1 indicative of points of direct connection to the network, ports-of-entry 98-2 indicative of points of connection of the core portion of the network, and/or information indicative of next-hop network devices 98-3). As just a few examples, the data sources that provide entity network location information may include IEEE 802.1X data source 58-2 (e.g., providing IEEE 802.1X entities data), ARP data source 58-4 (e.g., providing data indicative of IP address to MAC address mappings), LLDP data source 58-5 (e.g., providing data indicative neighboring entities and/or entity identities), Wi-Fi data source 58-7 (e.g., providing wireless network client data), and/or other sources 38 (in FIGS. 1 and 4).

If desired, entity network location information in entry 42 for a unified entity may include historical or a time-series of network location information such as historical data of network locations 98-1, ports-of-entry 98-2, and/or next-hop network devices 98-3 (e.g., indicative of how the unified entity has connected to the network over time).

Figure 10:
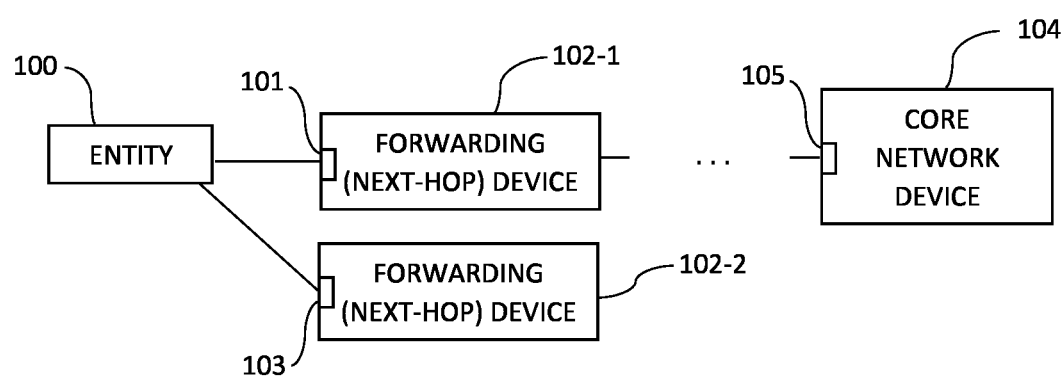
FIG. 10 is a diagram of an illustrative network entity for which corresponding unified entity network-location-based information is maintained in accordance with some embodiments.

FIG. 10 is a diagram of an illustrative network portion (e.g., of network 8 in FIG. 1) that includes a network entity such as entity 100 coupled to an illustrative set of network devices (e.g., some of network devices 10 in FIG. 1). Application 44 may aggregate entity information from the various sources (e.g., sources described in connection with FIG. 9) to generate a corresponding unified entity entry that includes network-location-based information for entity 100. As part of the network-location-based information, application 44 may identify forwarding devices 102-1 and 102-2 and respective ports 101 and 103 as the points of connection of entity 100 to the network (e.g., as network locations 98-1 in FIG. 9), may identify core network device 104 (e.g., implementing an edge of the core network and connected to entity 100 via at least forwarding device 102-1) and its corresponding port 105 as the port-of-entry of entity 100 (e.g., as port-of-entry 98-2 in FIG. 9), and/or may identify forwarding devices 102-1 and 102-2 (e.g., wireless access points, switches, routers, and/or other network devices) as the next-hop devices of entity 100 (e.g., as next-hop devices 98-3 in FIG. 9).

Figure 11:
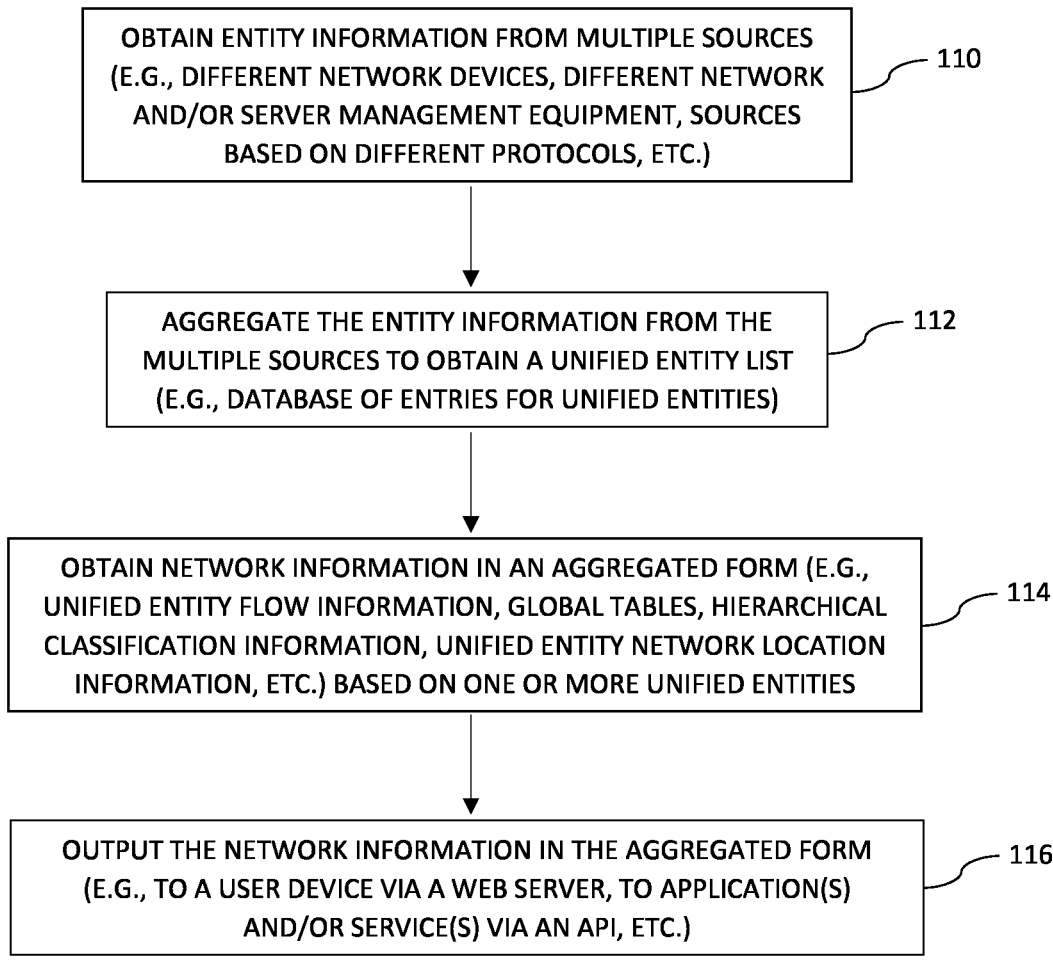
FIG. 11 is a flowchart of illustrative operations for operating a network entity aggregation system in accordance with some embodiments.

FIG. 11 is a flowchart of illustrative operations for performing network entity aggregation. These operations may be performed using network entity aggregation system 30 and/or other elements of the networking system in FIG. 1. In configurations described herein as an illustrative example, the operations described in connection with FIG. 11 may be performed by processing circuitry 32 for system 30 by executing software instructions stored on memory circuitry 34. If desired, one or more operations described in connection with FIG. 11 may be performed by other dedicated hardware components in system 30. In other illustrative configurations, at least some of these operations may be performed by one or more sources 38, network devices 10, and/or end hosts 20 in FIG. 1 (e.g., performed by processing circuitry of the respective device and/or equipment by executing software instructions stored on memory circuitry of the respective device and/or equipment).

At block 110, entity information aggregator application 44 and/or interface service(s) 46 in system 30 (e.g., processing circuitry 32 executing the software instructions for application 44 and/or service(s) 46) may obtain entity information from multiple sources via input-output interfaces 36. These sources may include different network devices, different pieces of network management equipment (e.g., network analysis platforms, network visibility platforms, network security platforms, etc.), different pieces of server management equipment (e.g., different end host server management platforms such as virtual machine management platforms), different sources operating with and/or that gather data associated with different network protocols, and other sources (e.g., sources described in connection with sources 38 in FIGS. 1 and 4).

At block 112, application 44 in system 30 (e.g., processing circuitry 32 executing software instructions for application 44) may aggregate the entity information from the multiple sources to obtain (e.g., generate) a unified entity list. This generated unified entity list may be stored in one or more databases as corresponding entries or records for the unified network entities (e.g., in database 40 as entries 42 described in connection with FIGS. 2 and 3).

At block 114, application 44 and/or interface service(s) 46 in system 30 (e.g., processing circuitry 32 executing software instructions for application 44 and/or service(s) 46) may obtain network information in an aggregated form based on the one or more unified entities. As examples, the obtained network information may include unified entity flow information, one or more global tables (e.g., constructed from local tables separately stored at various network devices), hierarchical entity classification information for one or more unified entities, unified entity network location information, and/or other types of network information associated with unified entities (e.g., types of information described in connection with FIGS. 3-10).

At block 116, application 44 and/or interface service(s) 46 in system 30 (e.g., processing circuitry 32 executing software instructions for application 44 and/or service(s) 46) may output the network information in the aggregated form (e.g., unified entity list information such as information in entries 42 in database 40 in FIG. 3 and/or other types of information inferred from or otherwise gathered based on the unified entity list information) via input-output interfaces 36. As examples, the unified entity list information and/or the network information in the aggregated form may be output to a user device via a web server (e.g., for providing content for presentation on one or more web pages displayed at the user device) and/or may be output to other (server) applications and/or services via corresponding APIs.

The methods and operations described above in connection with FIGS. 1-11 may be performed by the components of one or more network devices and/or servers (server equipment) or other host equipment using software, firmware, and/or hardware (e.g., dedicated circuitry or hardware). Software code for performing these operations may be stored on one or more non-transitory computer-readable storage media (e.g., one or more tangible computer readable storage media) stored on one or more of the components of the network device(s) and/or server equipment or other host equipment. The software code may sometimes be referred to as software, data, instructions, program instructions, or code. The one or more non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the network device(s) and/or server equipment or other host equipment (e.g., processing circuitry 32 in system 30 of FIG. 1).

The foregoing is merely illustrative and various modifications can be made to the described embodiments. The foregoing embodiments may be implemented individually or in any combination.

What is claimed is:

1. A network entity aggregation system comprising:
processing circuitry;
memory circuitry; and
one or more input-output interfaces, wherein the processing circuitry is configured to:
receive, via the one or more input-output interfaces, network entity information from a plurality of sources,
aggregate the network entity information to obtain a unified entity list that includes a Media Access Control (MAC)-type unified entity, the MAC-type unified entity containing a first Internet Protocol (IP)-type sub-entity identifiable by a first IP address and containing a second IP-type sub-entity identifiable by a second IP address, identify network flow information for the MAC-type unified entity by aggregating network flow information for the first IP-type sub-entity based on the first IP address and network flow information for the second IP-type sub-entity based on the second IP address, and output, via the one or more input-output interfaces, the identified network flow information for the MAC-type unified entity the network information.

2. The network entity aggregation system defined in claim 1, wherein the memory circuitry is configured to store entity records for unified entities in the unified entity list, including a given entity record for the MAC-type unified entity.

3. The network entity aggregation system defined in claim 2, wherein the given entity record in the entity records includes information from multiple sources in the plurality of sources.

4. The network entity aggregation system defined in claim 3, wherein the multiple sources comprise a source of network address assignment information, a source of network access control information, and a source of wireless network information.

5. The network entity aggregation system defined in claim 3, wherein the given entity record includes entity classification information that has different levels of specificity.

6. The network entity aggregation system defined in claim 3, wherein the given entity record includes information indicative of one or more network locations of the MAC-type unified entity.

7. The network entity aggregation system defined in claim 6, wherein the information indicative of the one or more network locations of the MAC-type unified entity comprises a point of direct connection to a network, a point of connection to a core portion of the network, or one or more next-hop network devices in the network.

8. The network entity aggregation system defined in claim 1, wherein the first IP-type sub-entity is associated with a single IP address that is the first IP address, wherein the second IP-type sub-entity is associated with a single IP address that is the second IP address, and wherein the MAC-type unified entity is associated with at least the first and second IP addresses.

9. The network entity aggregation system defined in claim 1, wherein the MAC-type unified entity is associated with a single MAC address.

10. The network entity aggregation system defined in claim 1, wherein the MAC-type unified entity and an additional MAC-type unified entity are included by a device-type unified entity.

11. The network entity aggregation system defined in claim 1, wherein the processing circuitry is configured to output the identified network flow information for the MAC-type unified entity to a web server for presentation on one or more web pages, or to an external application or service via an application programming interface.

12. A method for obtaining a network entity, the method comprising:

obtaining, by a network entity aggregation system, first information indicative of a first representation of the network entity from a first source;

obtaining, by the network entity aggregation system, second information indicative of a second representation of the network entity from a second source;

generating, by the network entity aggregation system, a unified network entity entry for the network entity, wherein the unified network entity entry associates the first information with the second information and wherein the network entity is a Media Access Control (MAC)-type entity, the MAC-type entity containing a first Internet Protocol (IP)-type sub-entity identifiable by a first IP address and containing a second IP-type sub-entity identifiable by a second IP address;

aggregating, by the network entity aggregation system, network flow information for the first IP-type sub-entity based on the first IP address and network flow information for the second IP-type sub-entity based on the second IP address to obtain network flow information for the MAC-type entity; and providing, by the network entity aggregation system, output based on the unified network entity entry, the output containing the network flow information for the MAC-type entity.

13. The method defined in claim 12, wherein the first information comprises information associated with a first network protocol and wherein the second information comprises information associated with a second network protocol.

14. The method defined in claim 12, wherein the first information comprises information gathered from a first network device and wherein the second information comprises information gathered from a second network device.

15. The method defined in claim 12, wherein the unified network entity entry comprises hierarchical classification information about the network entity, wherein the hierarchical classification information includes a broad level of classification of the network entity and a specific level of classification of the network entity, and wherein the broad level of classification of the network entity and the specific level of classification of the network entity are obtained from the first source.

16. The method defined in claim 12, wherein the MAC-type entity and an additional MAC-type entity are included by a device-type entity.

17. The method defined in claim 12, wherein the unified network entity entry includes network-location-based information for the network entity.

18. A method for aggregating network entity information, the method comprising:

obtaining the network entity information from a plurality of sources;

aggregating the network entity information to identify a list of unified network entities that includes a Media Access Control (MAC)-type unified entity, the MAC-type unified entity containing a first Internet Protocol (IP)-type sub-entity identifiable by a first IP address and containing a second IP-type sub-entity identifiable by a second IP address;

storing a record for each unified network entity in the list of unified network entities;

obtaining network flow information for the MAC-type unified entity by aggregating network flow information for the first IP-type sub-entity based on the first IP address and network flow information for the second IP-type sub-entity based on the second IP address; and outputting the network flow information for the MAC-type unified entity.

19. The method defined in claim 18, wherein outputting the network flow information for the MAC-type unified entity comprises outputting the network flow information for the MAC-type unified entity to a web server for presentation to a user device.

20. The method defined in claim 18, wherein the MAC-type unified entity and an additional MAC-type unified entity are included by a device-type unified entity.

\* \* \* \* \*